Feb. 9, 1960 E. M. JONES 2,924,138
ELECTRONIC SYNCHRONIZING SYSTEM FOR
PRODUCING PITCH DISCS AND THE LIKE
Filed June 15, 1954 6 Sheets-Sheet 1
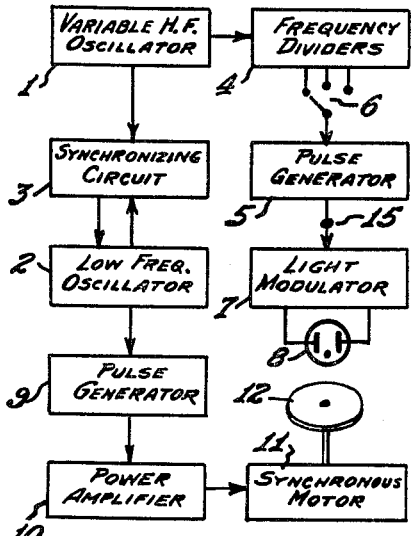
FIG. 1.
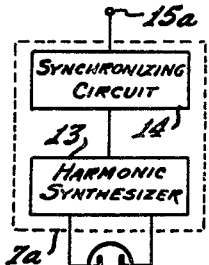
FIG. 2.
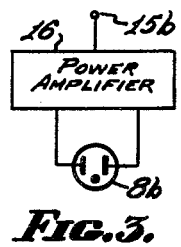
FIG. 3.
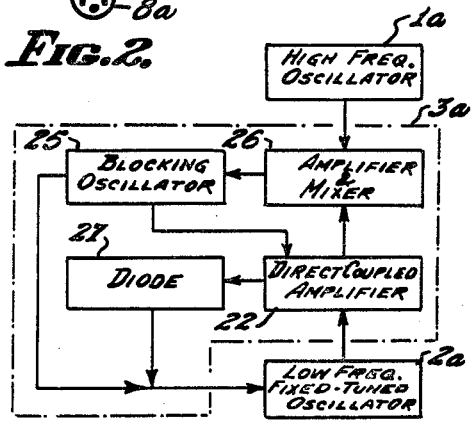
FIG. 4.
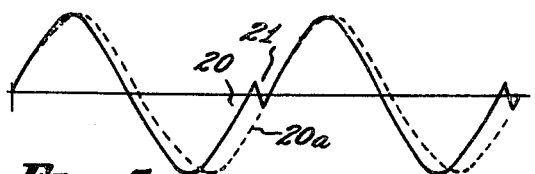
FIG. 5.
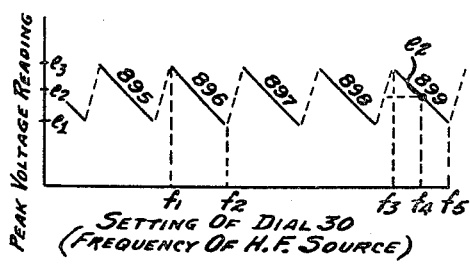
FIG. 6.
FIG. 8.
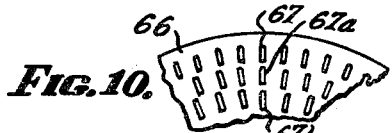
FIG. 10.
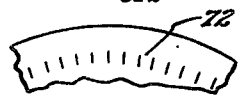
FIG. 11.
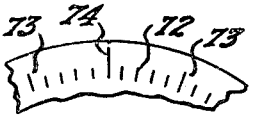
FIG. 12.
FIG. 13.
FIG. 14.
INVENTOR.
EDWARD M. JONES,
BY
ATTORNEY Feb. 9, 1960

E. M. JONES 2,924,138

ELECTRONIC SYNCHRONIZING SYSTEM FOR
PRODUCING PITCH DISCS AND THE LIKE

Filed June 15, 1954

INVENTOR.
EDWARD M. JONES,
BY
ATTORNEY

Feb. 9, 1960

E. M. JONES 2,924,138

ELECTRONIC SYNCHRONIZING SYSTEM FOR
PRODUCING PITCH DISCS AND THE LIKE

Filed June 15, 1954

INVENTOR.
EDWARD M. JONES,
BY
Alois W. Graf
ATTORNEY.

Feb. 9, 1960

E. M. JONES 2,924,138

ELECTRONIC SYNCHRONIZING SYSTEM FOR
PRODUCING PITCH DISCS AND THE LIKE

Filed June 15, 1954

Inventor
Edward M. Jones
By Alvin W. Graf
Attorney

Feb. 9, 1960

E. M. JONES 2,924,138

ELECTRONIC SYNCHRONIZING SYSTEM FOR
PRODUCING PITCH DISCS AND THE LIKE

Filed June 15, 1954

Inventor
Edward M. Jones
By Alex W. Graf
Attorney

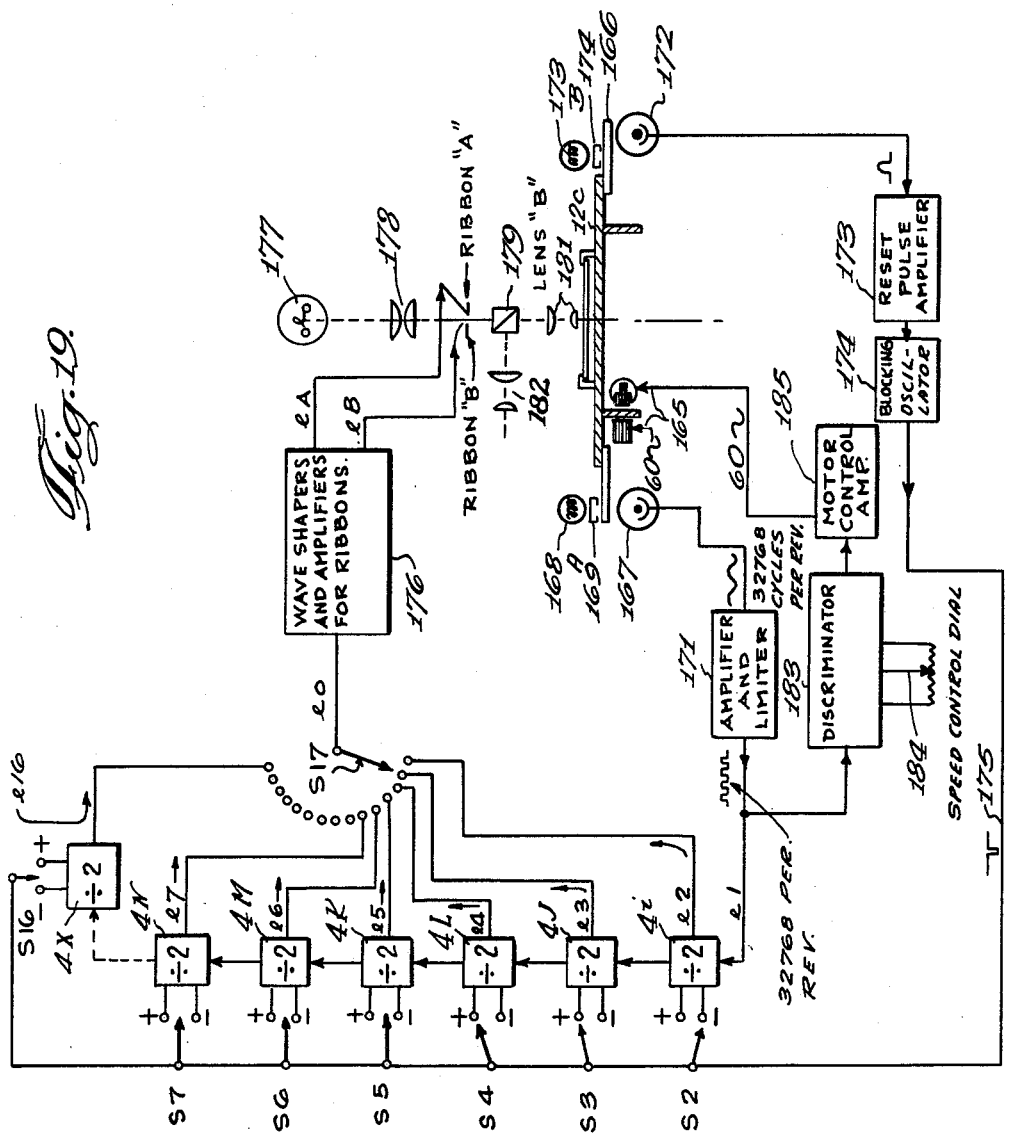

United States Patent Office 2,924,138
Patented Feb. 9, 1960

2,924,138

ELECTRONIC SYNCHRONIZING SYSTEM FOR PRODUCING PITCH DISCS AND THE LIKE

Edward M. Jones, Cincinnati, Ohio, assignor to The Baldwin Piano Company, Cincinnati, Ohio, a corporation of Ohio Application June 15, 1954, Serial No. 436,831

42 Claims. (Cl. 84—1.28)

My invention relates generally to devices for producing code members and to devices for synchronizing movement of a member with a recording means. In particular, my invention relates to apparatus for establishing a relation of one cycle or revolution of motion of a moving object, such as a turntable, to an integral number of cyclic variations of a source of electric potential which controls a recording means, such as a light source.

This application is a continuation-in-part of my copending patent application for Electronic Synchronizing System for Producing Pitch Discs and the like, Serial No. 135,912, filed December 30, 1949, now Patent No. 2,839,960, and assigned to the assignee of this application.

The particular uses to which I have put my invention are (1) producing pitch-determining scanning discs for photoelectric musical instruments, (2) producing voice (wave form) discs for such instruments, and (3) dividing a circle into any of a wide range of equal parts. It will be obvious to those skilled in the art that my invention has many other uses, such as producing scales for protractors, azimuth indicators and devices requiring the division of a given distance into equal parts or recurring patterns. Also, my invention may be used in electrical circuits in which a plurality of frequencies must be maintained in ratios of large prime numbers.

Although I shall describe my invention with respect to the three specific uses mentioned above, it will be understood that the appended claims shall be construed broadly to cover apparatus for producing equally divided re-entrant paths containing integral numbers of cyclic patterns and for graduating circles, scales and the like.

It is well known that musical tones can be produced by means of a system wherein: first, a beam of parallel light is directed through a series of playing-key-openable apertures selectively exposing small, circumferential segments of concentric rows of transparent areas in an opaque pitch disc rotated at a speed such that areas in respective rows pass their respective apertures at rates corresponding to the fundamental frequencies of the tones desired; second, the rays of light thus produced are caused to scan wave form patterns of a variable opacity or variable area type; and third, the varying rays are directed upon a photo-cell in an appropriate circuit including electroacoustic translating means. It is also known that to produce higher order harmonics of a given complex tone, the scanning rays must be extremely narrow, thus requiring that transparent areas in the pitch disc be narrow radial slots.

Extreme accuracy is required in locating the transparent slots equidistantly around the respective rows of a pitch disc. Random variations in the distance between adjacent slots are productive of extraneous frequencies resulting in low signal-to-noise ratios, while cumulative errors in spacing around a row of slots result in low-frequency modulation, commonly known as "wow." Also, those skilled in the art know that through a given aperture a plurality of cycles of wave form patterns may be scanned simultaneously by an equal number of transparent slots and that the respective cycles of wave form patterns must be spaced exactly the same as the transparent slots which cause light beams to scan them.

As disclosed by Armand F. Knoblaugh in a copending application entitled Musical Instruments Employing Continuously Moving Members, Serial No. 39,674, filed July 20, 1948, now Patent No. 2,586,664, practical pitch discs for photoelectric musical instruments may be of the order of one foot in diameter. Discs of this type require many rows of slots, some of which have prime numbers of slots of the order of 1000 and less for approximating the equally tempered scale. In making such a disc, a first criterion is an equal spacing of a given number of slots about the specific circumference of a given pitch track. The slots must be so spaced as to come out even, since otherwise there will be extraneous noise. A second criterion is accuracy in the spacing of the slots. My experience with such discs indicates that random variations in the distance between adjacent slots of the order of .0001 inch, obtainable by another method I have employed, produce a signal-to-noise ratio which is lower than desirable in high-quality electronic musical instruments.

Previously employed apparatus producing pitch discs have either lacked the accuracy desired or have required large amounts of time for their production. In the practice of one phase of my invention, I synchronously translate a transparent member having a photosensitive coating thereon by means of a motor energized from a source, the frequency of which can be altered from a nominal one as required to make one revolution correspond exactly in time to that of an integral number of pulses of energy supplied to a light source which is used to produce the images of the slots upon the photosensitive coating for exposure thereof.

My invention, in brief, comprises a system by means of which a wide range of dividing ratios between the frequency of the source of potential producing light pulses or variations and the speed of the motor is available, so that the desired number of photographically produced slots or cycles of wave forms may be produced in the respective adjacent rows on a code member. During the exposure of a given row, a disc may be rotated a number of times in order that the individual cyclic areas may receive sufficient light to expose the photographic emulsion. It can readily be seen that these requirements necessitate an extremely stable and precise system. The speed of the motor must be extremely constant, and the dividing ratio between the frequency of light variations and the frequency of the energy supplied to the synchronous motor must be an exact integer.

A broad object of my invention is to provide methods and means for dividing re-entrant paths into integral numbers of cyclic patterns.

Another broad object is to divide a circle into a number of equal parts.

A more specific object of my invention is to provide a method and means whereby a relatively low-frequency electronic oscillator may be synchronized with a source of relatively high-frequency oscillations, so that the frequency of the former will be a submultiple of the frequency of the latter.

Another object is to provide a means whereby a relatively low-frequency oscillator may be synchronized with a relatively high-frequency, variable-frequency source so that their respective frequencies can be related by any one of a wide range of consecutive integers as desired.

A specific object of my invention is to provide a means whereby the speed of an element driven by synchronous means may be synchronized with any one of a wide range of frequencies of light variations, so that one revolution or cycle of motion of said element occurs exactly during an integral number of cycles of said light variations.

A further object is to provide a means for producing a series of equally, accurately and closely-spaced narrow graduations upon a photosensitive surface.

Another object of the invention is to provide means for producing a series of graduations, as in the preceding object, but which are indexed, that is, certain regularly spaced graduations are longer than others.

Still another object is to provide a means for producing a series of two or more concentric circles of graduations, in which series at least one graduation in one circle is co-radial with one graduation in another circle of said series.

A still further object of my invention is to produce a voice disc for a photoelectric musical instrument.

An object of my invention is to provide means for synchronizing the frequency of the output of a variable-frequency harmonic synthesizer and the speed of an electric motor so as to produce an integral number of cycles of a desired wave form during each revolution of a member driven by the motor.

These and other objects of the invention, which will be set forth hereinafter or will be apparent to one skilled in the art upon reading this specification, I accomplish by those certain constructions, circuits and arrangements of parts of which I shall now describe exemplary embodiments.

Reference is made to the accompanying drawings, wherein:

Figure 1 shows a block diagram of a basic system for obtaining one revolution of a turntable during an integral number of pulses of light;

Figure 2 is a block diagram of a portion of the system of Figure 1, such as I employ for synchronizing the speed of a turntable with cyclic variations of light other than pulses;

Figure 3 is a block diagram of the same portion of the system of Figure 1, such as I employ for synchronizing the speed of a turntable with pulses of light;

Figure 4 is a block diagram of the essential elements in a synchronizing system according to my invention;

Figure 5 is a graphical representation of the wave form of voltage across the tuned circuit of the low-frequency oscillator of Figure 4;

Figure 6 illustrates the wave form of the output of the direct-coupled amplifier of Figure 4;

Figure 7 is a diagram, partly schematic, partly block, of a complete system for graduating a circular path;

Figure 8 shows a graph of the relationship between the reading of a peak voltmeter and the frequency of a high-frequency source;

Figure 9 illustrates an aperture system such as may be employed with my invention;

Figure 10 shows a portion of a pitch disc having a co-radial series of slots;

Figure 11 represents part of a series of graduations such as may be produced by the system of Figure 7;

Figure 12 represents a series of indexed graduations;

Figure 13 shows exaggerated results of a method by which the graduations of Figure 12 may be produced;

Figure 14 shows a plurality of wave form patterns such as may be produced by the system of Figure 15;

Figures 18 and 19 are block diagrams illustrating applications of the synchronizing system.

*The basic problem*

Figure 16:
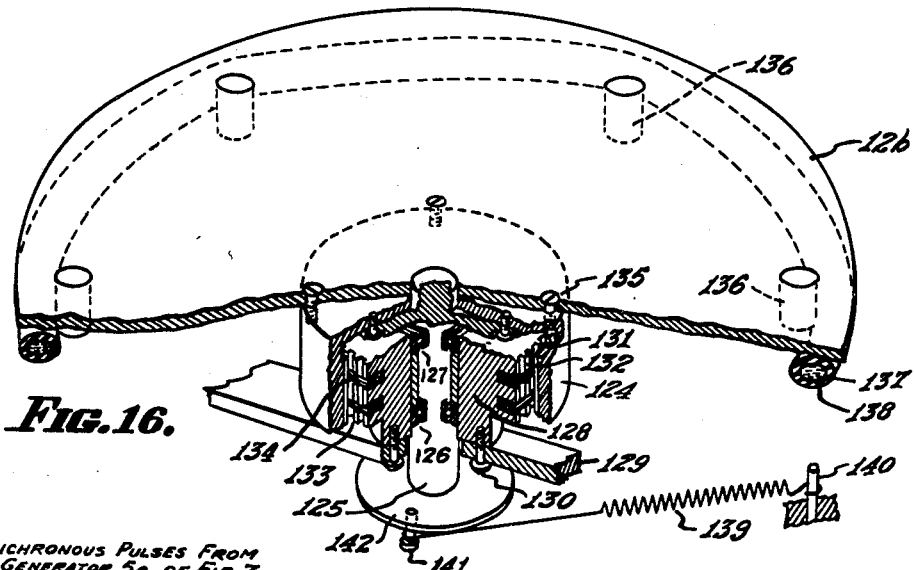
Figure 16 illustrates a synchronous motor and turntable assembly.

The basic problem to which the hereindescribed exemplary embodiments afford a practical solution, is to cause one revolution or cycle of motion of an element to occur in exactly the same amount of time required for a preselected number of electric pulses or of cycles of a cyclic electric wave of desired form generated by a separate source. Ancillary to the basic problem is the problem of causing a light source to vary in intensity in accordance with the pulses or with the variations in amplitude of the electric wave.

*General method*

The solution to the basic problem lies, according to one embodiment of my invention, in the following general method. First, I produce relatively low-frequency electrical oscillations at a rate which is used to determine the rotational speed of a motor driving the moving element. Second, I generate relatively high-frequency oscillations which can be varied over a range of frequencies depending upon certain requirements to be discussed in detail hereinafter. Third, by a series of dividers, I divide the high-frequency oscillations by consecutive integral powers of the dividing ratio of the dividers. Fourth, I select from the series of dividers a particular divider having a frequency range (over the range of adjustment of the high-frequency generator) in which there occurs that particular frequency which will produce the desired number of cycles during one revolution of the element driven by the synchronous motor. Fifth, I synchronize the frequency of the lower frequency oscillations with that of the higher frequency oscillations so that the former is exactly a submultiple of the latter. Sixth, I modulate the intensity of a light source at the rate selected in step four of this method.

If the modulation of the light source is to be in the nature of a pulse, I generate a pulse of a desired shape at the frequency selected in step four above.

If the modulation of the light source is to be in the nature of a sine wave, or of complex variations, I first generate oscillations of the desired wave form and then synchronize their fundamental frequency with the frequency of the pulses generated at a rate selected in step four above.

*The basic system*

Briefly, in the practice of this embodiment of my invention, I employ a relatively high-frequency, variable-frequency oscillator 1 (Figure 1) which is continuously variable over a range of at least two-to-one. A second oscillator 2 is "fixed-tuned" at a relatively low-frequency which can be altered slightly by the injection of a synchronizing pulse from the synchronizing circuit 3 into its tuned circuit during each cycle of oscillation. By proper injection of this pulse, it is possible to make the frequency of the low-frequency oscillator 2 a submultiple of the frequency of the high-frequency oscillator 1, no matter what the frequency of the latter may be within its range.

My invention in one of its aspects concerns itself with a system for introducing the synchronizing pulses just referred to. However, in the specific uses which I make of the system, I may employ additional circuits in connection with the oscillators described above.

First, I may use the high-frequency oscillator 1 to trigger a series of frequency dividers collectively designated at 4, each dividing by two the frequency of the preceding one. Second, a pulse generator 5, connectable by a selector switch 6 to one of the dividers 4 for a desired dividing ratio, is triggered by that divider and determines the frequency at which a light modulator 7 modulates the intensity of a light source 8, such as a crater lamp. Third, the low-frequency oscillator 2 may be used to determine the frequency of a wide-pulse generator 9 which supplies, through a power amplifier 10, pulsating direct current to a synchronous driving means, such as a motor 11 driving a turntable 12, upon which may be mounted a photosensitive plate to be converted to a pitch disc or voice disc, or upon which a divided circle is to be formed.

The general system of Figure 1, just described, provides means whereby one revolution of a turntable will occur during a desired whole number of cyclic variations in the intensity of the light source.

When I desire to produce during each revolution of the turntable 12 an integral number of cycles of a specific wave form, the light modulator 7 of Figure 1 comprises those elements of Figure 2 included in the area bound by the dashed line 7a—namely, a variable-frequency, variable-wave form, harmonic synthesizer 13, the fundamental frequency of the wave desired therefrom being synchronized by means of a synchronizing circuit, indicated generally at 14, with the pulses provided by the pulse generator 5 via the point 15a, which in this case is connected to the pulse generator 5 at the point 15. The synthesizer may include amplification means for supplying to the lamp 8 sufficient energy to produce a desired level of intensity.

If I desire to produce during each revolution of the turntable 12 an integral number of "pulses" of light, I simply employ in the place of the light modulator 7 a power amplifier 16 (see Figure 3), the terminal 15b being connected to the pulse generator 5 at the point 15.

*The oscillator synchronizing system*

The synchronizing circuit 3 of Figure 1 preferably comprises the general circuit divisions shown in Figure 4 in the area surrounded by the dot-dash line 3a, although in the broader aspects of my invention I am not limited thereto. It will be obvious as this specification is read that other synchronizing circuits could be employed.

Referring to Figure 4, the relatively high-frequency oscillator 1a may be continuously variable, if so desired, over a range of frequencies determined by the dividing ratio of dividers such as 4 (Figure 1), as will be explained in detail hereinafter. The relatively low-frequency oscillator 2a, preferably of the L-C type, is "fixed-tuned" at a frequency $f_n$ suitable for a desired purpose, such as determining the speed of a synchronous motor. The frequency of this oscillator 2a can be altered slightly by the injection of a synchronizing pulse into its tuned circuit during every cycle of its sine wave oscillation. When this is done, the wave form 20 of the voltage across this tuned circuit will have a "notch" in it, as indicated at 21 in Figure 5, effectively altering it to a different frequency. By the proper introduction of the synchronizing pulse, it is possible to make the low-frequency oscillator 2a operate at a frequency which is a submultiple of the frequency of the high-frequency oscillator 1a. Since the frequency imposed on the light source 8 from the selected divider is also a submultiple of the frequency of the high-frequency oscillator, it will be evident that the frequency of the light source and the altered frequency of the low-frequency oscillator 2a will be related as a whole-number ratio.

The method of injecting the synchronizing pulse will be explained in general first, the circuit details being described hereinafter. The sine wave voltage from the low-frequency oscillator is fed through a direct-coupled amplifier 22 (Figure 4), the output of which would normally be substantially a square wave due to overloading, as indicated by the dashed curve 23 in Figure 6. The "actual" output of the amplifier 22, as represented by the solid line 24, is a pulse because of the feedback of a blocking oscillator 25 (Figure 4) discussed in detail hereinafter.

Trigger pulses from the high-frequency oscillator 1a are fed to the blocking oscillator 25 along with the output of the direct-coupled amplifier 22 via an amplifier-and-mixer 26. The bias on the blocking oscillator 25 is adjusted so that it will not be triggered by a pulse from the high-frequency oscillator 1a until the pulse 24 from the direct-coupled amplifier 22 has started. Since the beginning of the pulse 24 occurs at a certain instant in each cycle of the low-frequency oscillator 2a, the blocking oscillator 25 will fire on the first trigger pulse from the high-frequency oscillator 1a after the instantaneous voltage of the low-frequency oscillator 2a passes through a certain value (in a positive direction).

Thus, the period of the blocking oscillator 25 is always about $1/f_n$ and an exact multiple of the period of the high-frequency oscillator (where $f_n$, as mentioned above, is the resonant frequency of the tuned circuit of the low-frequency oscillator 2a). However, the former period would alternate between two adjacent values if means were not provided to regulate it automatically.

The period of the low-frequency oscillator 2a is altered during each cycle by combining the output of the direct-coupled amplifier 22 with a pulse from the blocking oscillator 25 and feeding it through a diode 27 to the tank circuit of the low-frequency oscillator 2a. The blocking oscillator pulse puts a small negative charge into the condenser in the tuned circuit of the low-frequency oscillator 2a forming the notch 21 in the curve 20 and delaying the progress of the wave slightly, so that its frequency is equal to that indicated by the dashed sine wave 20a, representing a frequency which is a submultiple of the frequency of the high-frequency oscillator 1a. The size of the notch 21 depends upon the instantaneous value of the voltage from the direct-coupled amplifier 22. If, for a desired ratio between the frequencies of the high and low frequency oscillators, the trigger from the high-frequency oscillator is slow in coming, the pulse from the direct-coupled amplifier 22 is given a chance to build up to a more negative value so that when the blocking oscillator pulse does occur, a larger negative pulse is fed to the tank circuit of the low-frequency oscillator 2a and the progress of the sine wave 20 is delayed still more. Thus, the period of the low-frequency oscillator 2a is lengthened to correspond with the slower triggers from the high-frequency oscillator 1a.

If the triggers are too slow in coming, the blocking oscillator 25 fires on an earlier trigger and a different ratio of frequencies is obtained. As the frequency of the high-frequency oscillator 1a is lowered, there occur sudden rises in frequency of the low-frequency oscillator 2a as the blocking oscillator 25 suddenly shifts to firing on an earlier trigger, and the size of the notch 21 in the curve 20 suddenly shifts from a maximum to a minimum value. If the frequency of the high-frequency oscillator 1a is varied, transitions from one ratio to another occur as the frequency of the high-frequency oscillator is tuned throughout its range.

*Circuit details of the oscillator synchronizing system*

The circuit details of the oscillator synchronizing means are presented in Figure 7, which shows a complete system for graduating a circular path. (Portions of the system which correspond to those previously described, have the same number but a different suffix letter; for example, the block 3 in Figure 1 represents the synchronizing system, whereas in Figure 4, the synchronizing system comprises elements enclosed by the dot-dash line 3a.) I shall first describe the circuit, thereafter explaining its operation in detail with reference to making a pitch disc or dividing a circle.

In Figure 7, a variable high-frequency oscillator 1b, preferably of the electron-coupled type known in the art, is provided with a tuning dial 30 for changing the frequency thereof. The pulsed output of the oscillator 1b is connected as shown to a series of frequency dividers 4a, 4b, 4c, 4d, etc., preferably multivibrators of the "flip-flop" type, each dividing by two the frequency of the pulses fed to it. Either the oscillator 1b or a divider such as 4a may be used as a source of variable frequency oscillations and may be connected as at 31 and 33 to a selector switch 32 for selecting a desired range of dividing ratios.

The dividers 4b, 4c, and 4d are respectively connected to terminals 34, 35 and 36 of a selector switch indicated generally at 6a. The common terminal 37 of the switch 6a is connected to a pulse generator 5a, which in turn is connected to a power amplifier 16a. The output of the power amplifier is connected to the electrodes of a light source 8c, such as a crater lamp. A light beam from the crater lamp is directed toward an aperture system comprising an opaque member 38 having a transparent slot 39, through which a ray passes and is converged by a condensing lens 40 toward a second lens 41. A minute image of the slot 39 is produced by the second lens 41 upon the surface of the disc 42 which may be coated with a photosensitive emulsion and may be located on a turntable 12a driven by a synchronous motor 50, described below.

I may, for reasons hereinafter given, employ an additional frequency divider 43 connected as shown by means of a selector switch 44 to the other dividers such as 4b, 4c and 4d. The divider 43 may be connected through a switch 45 to another pulse generator 46, the output of which may be fed to an amplifier 47, thence to a second crater lamp 48. By means of a mirror 49, the beam from the lamp 48 may be diverted and directed through the aperture 39 and lens system to the plate 42.

The contact arm of the switch 32 is connected as shown to an amplifier and mixer circuit 26a, the output of which is connected to the grid of a vacuum triode T1 which acts as a cathode follower. Tubes T1 and T2, together with their associated components, comprise the blocking oscillator group 25a. The cathode of tube T1 is grounded through the resistor R1 and is connected through the winding L3 of a transformer indicated generally at 51 to the grid of the blocking oscillator tube T2. The plate of tube T2 is connected through the winding L1 of the transformer 51 to a positive plate potential V3 at the point 52. The cathode of tube T2 is connected through a resistor R2, paralleled by a capacitor C1, to a positive potential V1, lower than the potential V3. The winding L2 of the transformer may be connected as shown to a trigger amplifier 54, the output of which is connected to a wide-pulse generator 55 which in turn is connected to the power amplifier 56. The winding of the synchronous motor 50 is energized from the power amplifier 56. Although the preferred type of motor employed by me in the practice of my invention will be discussed in detail hereinafter, it should be stated at this point that I use a direct drive as one of several features to obtain as nearly constant speed as possible. Consequently, by way of example, if I desire to run the turntable 12a at a speed of the order of 2 r.p.s. by means of wide pulses at a frequency of the order of 256 c.p.s., I have 128 teeth on the rotor and a matching set of 128 teeth on the stator.

The cathode of the tube T2 is also connected to the cathode of a vacuum triode T3, and the tubes T2, T3, and T4, together with their associated components, comprise a direct-coupled amplifier, indicated generally at 22a. An input connection to the direct-coupled amplifier is made at the grid of the tube T3 by the lead 57 which transmits the output of a low-frequency L-C type oscillator, indicated generally at 2b, and comprising vacuum triodes T5 and T6 and associated components. The plate of the tube T3 is connected to the grid of a cathode follower triode T4. Positive plate potential V3 for the tubes T3 and T4 may be connected at the point 58, the resistor R4 being in series with the plate of the tube T3. The cathode of the tube T4 is connected to ground through a resistor R5 paralleled by capacitor C2. The output of the cathode follower is carried to a common point 59, from which a connection is made to the amplifier and mixer circuit 26a through a resistor R6 and capacitor C3. The potential at the point 59 is measured by a peak voltmeter 60. Point 59 is connected also through a capacitor C8 to the cathode of a vacuum diode T7 which is biased through a resistor R14 at a positive potential V2 of an amount between V1 and V3 above. The plate of T7 is connected through the lower section 61 of a double-pole, double-throw switch 62 and through the winding L4 of the transformer 51 to a resonant circuit comprising a capacitor C4 and an inductive element L5 in the low-frequency oscillator 2b. The other section 63 of the switch 62 provides means for connecting the resonant circuit L5—C4 to ground through a variable capacitor C7. The other side of the circuit L5—C4 is connected along with the cathode of the oscillator tube T5 to the potential V1 at the point 65. The coil L6, which is inductively coupled to L5, is connected in series with the resistor R13 between the plate of tube T5 and the positive potential V3.

The grid of T5 is connected as shown in Figure 7 through a network consisting of C6, R9, R10 and R11 to the cathode of tube T6, acting as a cathode follower, the grid of which is connected to the tuned circuit L5—C4. The grid of the direct-coupled amplifier tube T3 is connected to the grid of tube T5 through R8 and C5 as shown. The grid of T3 is connected also to ground through resistor R3 and to the plate of tube T5 through resistor R7.

The cathode of the tube T6 is connected also through a phase-shift network 70 to one of the horizontal and to one of the vertical deflection plates of a cathode-ray tube T8. Also connected to the same vertical deflection plate are capacitor C10, which transmits a pulse from the pulse generator 5a, and capacitor C11, which transmits a pulse from the blocking oscillator 25a. The other horizontal and vertical plates, along with the second anode of the tube T8, are connected to the relatively high potential V4. A focus potential is supplied in the usual manner at 71. A potential between the grid and cathode of the tube T8 for varying the intensity of the trace is provided by the potentiometer R12 in series with the source of potential V1. A series resistor R18 is connected between the variable contact of the potentiometer and the grid of the tube T8, this grid being connected also to the plate of a vacuum triode T9. The grid of T9 is connected through a capacitor C9 to the fixed set of plates of a variable capacitor C12, the movable plates of which are mounted upon the turntable 12a, which is electrically grounded. Connection to the positive potential V4 for the capacitor C12 is made through a resistor R17, as shown. The cathode and grid of T9 are respectively connected through resistors R15 and R16 to ground as illustrated in Figure 7.

An exemplary set of values for the elements in Figure 7 is listed below:

| | | |
|---|---|---|
| R1 | ohms | 27,000 |
| R2 | do | 18,000 |
| R3 | megohms | 1 |
| R4 | do | 1 |
| R5 | ohms | 30,000 |
| R6 | do | 100,000 |
| R7 | megohms | 1.8 |
| R8 | ohms | 82,000 |
| R9 | do | 3,400 |
| R10 | do | 27,000 |
| R11 | do | 27,000 |
| R12 | do | 650,000 |
| R13 | do | 66,000 |

| | | |
|---|---|---|
| R14 | do | 47,000 |
| R15 | do | 10,000 |
| R16 | meghoms | 2.2 |
| R17 | do | 4.7 |
| R18 | ohms | 130,000 |
| C1 | mf | .01 |
| C2 | mmf | 800 |
| C3 | do | 300 |
| C4 | do | 12,500 |
| C5 | do | 1,500 |
| C6 | do | 2,200 |
| C7 | do | 140(max.) |
| C8 | mf | .01 |
| C9 | do | .0034 |
| C10 | mmf | 25 |
| C11 | do | 25 |
| C12 | do | 15(max.) |
| L1 | turns | 167 |
| L2 | do | 42 |
| L3 | do | 83 |
| L4 | do | 84 |
| L5 | henries | 8 |
| L6 | do | .2 |
| T1 | | 6SN7 (½) |
| T2 | | 6SN7 (½) |
| T3 | | 6SL7 (½) |
| T4 | | 6SN7 (½) |
| T5 | | 6SN7 (½) |
| T6 | | 6SN7 (½) |
| T7 | | 6H6 (½) |
| T8 | | 902A |
| V1 | volts | 95 |
| V2 | do | 165 |
| V3 | do | 275 |
| V4 | do | 420 |

Crater lamp—R1130B (Sylvania).
No. of teeth in synchronous motor—128.
Nominal frequency of low-frequency oscillator 2b—500 c.p.s.
Frequency range of high-frequency oscillator 1b—256 to 512 kilocycles sec.
Nominal frequency of pulses fed to motor—250 c.p.s. (employing as the pulse generator 55 a multivibrator circuit, dividing by two its input frequency).
Width of pulses fed to motor—1700 microseconds.
Nominal speed of synchronous motor 50—2 r.p.s. (approx.) (more accurately 250/128).

I shall next explain the operation of the system shown in Figure 7. The sinusoidal potential developed across the tuned circuit L5—C4 is applied to the grid of the cathode follower tube T6 resulting in a sinusoidal potential at the cathode of T6. The potential on the grid of the tube T5 would be a sine wave except that the positive half is flattened due both to grid current flow and to the fact that R10 is large enough to prevent excessive grid current. Feedback potential for sustaining the oscillations in the tuned circuit L5—C4 is obtained from the plate circuit of T5 by inductive coupling between the windings L6 and L5.

A signal is fed from the low-frequency oscillator through the resistor R8 and capacitor C5 to the grid of the tube T3 in the direct-coupled amplifier 22a, the purpose of which is to provide a steep-front wave occurring at the instant that the sine wave oscillation in tuned circuit L5—C4 passes through the zero point in a cycle. Resistors R9 and R11 act as a voltage divider for the purpose of fixing the direct current bias on the grid of T3 at a point which permits T3 to start conducting at the exact half-cycle point in a given sine wave of oscillation of the circuit L5—C4. This prevents the low-frequency oscillator from oscillating at different amplitudes due to changes in amplitude of the synchronizing pulses which will be discussed below. After the plate potential of the tube T3 has gone to quite a low value, it is desirable to terminate the pulse and somehow bring the wave back positive again. This is accomplished by two means. First, since the cathode of the amplifier tube T3 is connected directly to the cathode of the blocking oscillator tube T2, the instant that oscillation starts therein, a positive voltage occurs on the cathode of tube T2 and also on the cathode of tube T3, thus cutting the tube T3 off. However, this positive voltage on the cathode of the T2 tube does not last very long and additional means for keeping the direct-coupled amplifier tube T3 cut off is employed. This second means is the resistor R7 which feeds to the grid of the tube T3 from the plate of the oscillator tube T5 a potential which accomplishes the desired result of keeping the tube T3 cut off after the blocking oscillator pulse has subsided. The output of the tube T3 is fed to the cathode follower tube T4. The wave form hence is a negative pulse, terminated on its decay side as explained above. The output of the cathode follower tube T4 is fed through R6 and C3 to one of the input points of the amplifier and mixer 26a, the output of which triggers off the blocking oscillator tube T2 through the cathode follower tube T1. However, the trigger is not effective until the amplifier and mixer 26a also receives a trigger from the oscillator 1b, or from a divider such as 4a, via the selector switch 32. Hence, the blocking oscillator T2 will fire after the pulse on the cathode follower T4 has started occurring, but not until a trigger pulse is received via the selector switch 32.

When the blocking oscillator fires, a voltage is induced across the winding L4, and conduction occurs in the diode T7 causing the "notch" mentioned above to occur in the sine wave across the oscillator winding L5. The size of the notch depends upon what the magnitude of the negative pulse on the cathode of the tube T4 is at the instant the blocking oscillator fires. If the trigger from the high-frequency oscillator is late, the notch is greater due to the fact that the end of the winding L4 marked "+" is at a more negative potential. Because the notch is greater, the progress of the sine wave is delayed more so that the next trigger will not occur any later with respect to the sine wave.

A quantity depending upon the size of the notch in the sine wave is measured by the peak voltmeter 60. The peak voltmeter measures the negative peak of the voltage on the cathode follower T4. The reason why the negative peak is significant is that it shows how late the trigger is working, because as soon as the trigger occurs, the build-up of the negative pulse on the cathode follower is terminated.

The sine wave oscillation occurring across the coil L5 is caused to produce a circular pattern on the scope T8 by means of a phase-shift network 70 which feeds voltages 90 degrees out of phase to the deflection plates. A series of vertical markers, such as pips, is superimposed upon the circular pattern by pulses from the pulse generator 5a through a capacitor C10, the switch 37 being set to a standard position and the dial 30 being adjusted so that a recognizable scope pattern is obtained. The recognizable scope patterns will occur whenever the frequency of the pulses produced by 5a is an integral multiple of the frequency of the low-frequency oscillator 2b. When the desired dividing ratio differs from one of these ratios, the high-frequency oscillator is first adjusted to give the nearest dividing ratio which has a recognizable scope pattern; then the dial 30 of the high-frequency oscillator is slowly turned in the proper direction until the peak voltmeter 60 has indicated a number of transitions equal the difference between the desired ratio and the above-mentioned nearest ratio producing the recognizable scope pattern. For example, if the ratio between the frequency of the high-frequency oscillator 1b and the frequency of the low-frequency oscillator 2b is to be 899 and the nearest ratio producing a recognizable pattern is 896, then the dial 30 is adjusted until the recognizable pattern is obtained (it might comprise, for example 14 pips superimposed upon the circular pattern). The dial is then turned in the increasing-frequency direction until three transitions are made as observed on the peak voltmeter 60. Referring to Figure 8, the "saw-tooth" characteristic shows an exemplary relationship between the reading of the peak voltmeter 60 and the setting of the dial 30. If the dial is set between $f1$ and $f2$, the dividing ratio will be 896. As the dial is turned in the higher frequency direction, three transitions from the maximum to the minimum peak voltmeter reading will occur before the desired ratio of 899 is obtained. This ratio will be maintained so long as the dial is set between $f3$ and $f5$. When it is desired to keep such a ratio for a considerable time, the dial should be set at $f4$, halfway between $f3$ and $f5$, which corresponds to the peak voltmeter reading $e2$, halfway between the extremes $e1$ and $e3$, so that any drift due to variations in temperature, line voltage, etc. will not allow the system to shift to an adjacent dividing ratio.

It will be clear that one highly advantageous feature of my invention is that minor shifts in the frequency of the high-frequency source will not affect the dividing ratio. For example, if the high-frequency oscillator frequency shifts to a slightly lower value, such as between $f3$ and $f4$, the peak voltmeter reading will increase, indicating, as explained above, that a larger delaying charge is being introduced into the low-frequency oscillator, reducing its frequency until it is exactly $\frac{1}{899}$ of the frequency of the high-frequency oscillator. Also, without losing synchronism, it is possible to readjust the high-frequency oscillator to bring the peak voltmeter reading back to the mean value $e2$ before a shift to an adjacent dividing ratio occurs.

I shall now describe the manner in which the system of Figure 7 can be employed to produce two or more concentric series of areas on a disc 42, an area in one series being co-radial with one area in the other series. First, I synchronize the system so that I may expose a desired number of areas in the first of the two series. Next, I throw the switch 62 to the upper position, so that no synchronizing pulses are introduced into the tuned circuit L5—C4 of the low-frequency oscillator 2b. Then I adjust the condenser C7 until the frequency of the low-frequency oscillator 7b is almost in synchronism with the high-frequency oscillator 1b. This is evidenced by the slow movement of the pattern on the scope T8 produced by the pulses from 5a. During each revolution of the turntable 12a, the plates of the capacitor C12 will mesh and cause a cut-off of the plate current in the tube T9 which has been conducting (due to the potential drop in the right-hand portion of potentiometer R12), thus causing the grid of T8 to be at a potential lower than that at the movable terminal of R12. Thus, the cut-off of plate current in T9 will result in an increase in the intensity of the scope T8 once in each revolution of the turntable 12a during the time that the condenser plates are enmeshed. The plates must be of such size that the angular displacement of the disc which occurs during the meshing of the plates is less than the disc displacement from one set of motor teeth to the next. Thus, since the rotor of the synchronous motor is allowed to "drift" (by not being in synchronism), eventually one of the many moving pips caused by pulses from the generator 5a will be superimposed upon the one fixed pip (the circular trace and this pip are derived from the same low-frequency source) on the scope caused by the pulse from the winding L2 of the blocking oscillator 25a during the intensified period when the plates of C12 are enmeshed. At this instant the switch 62 is thrown to the synchronizing (lower) position, and pulses from the generator 5a will remain superimposed upon the pulse from the blocking oscillator occurring on the intensified trace. After an exposure has been made for producing the first series of areas, the aperture 39 or the whole optical system is shifted to the position corresponding to the radius desired for the second series of areas.

A structure such as that illustrated in Figure 9 may be used conveniently for shifting the aperture. The slider 38a has an aperture 39a of desired dimensions, and is movable with respect to the member 38b which has a longer aperture 39b.

If a different number of areas is desired in the second series, the new dividing ratio is selected and the system is synchronized for it. Then, in a manner similar to that just described, the motor pip and the pulse generator pip are superimposed, the system is resynchronized, and the second series of areas is exposed. By this procedure, low-frequency pulses occur at certain positions of the turntable corresponding to the various meetings of the rotor and stator teeth. For one of these positions, the trace on the scope is intensified, and if a light pulse is made to occur at this instant, it will produce an image on a particular radial line which will always be the same for the various rows of areas exposed. Thus, it is possible to establish co-radiality between two areas or graduations in different concentric series. An example of co-radial relationship is illustrated in Figure 10, wherein a portion 66 of an opaque pitch disc for a photoelectric musical instrument has co-radial transparent slots 67, 67a and 67b in three adjacent concentric rows.

The above description referring to Figures 7 and 9 has been concerned with the production of one or more circular series of "equal length" graduations on a disc. In Figure 11 is shown a series of such graduations 72. In order to meet certain of the objects of my invention, I provide means for causing certain regularly-spaced graduations to be longer than the others for indexing purposes. An example of such a series is illustrated in Figure 12. Graduations such as 73 are longer than those designated 72, but not as long as those numbered 74. I can index graduations by either of the following systems.

First, I may produce the extended portions of the longer graduations by exposing these areas simultaneously with the areas of which they are in extension. In Figure 13 is illustrated a series of graduations produced by this method. However, the spaces between the extended portions 73a and the main portions 72a has been exaggerated for the purpose of illustrating the technique involved. The means employed to accomplish this result comprises the elements at the right-hand end of Figure 7. If the selector switch 44 is connected to the same divider as the switch 6a, and if the switch 45 is closed, the pulses of light which will be emitted from the crater lamp 48 will not occur as often as the pulses produced by the lamp 8c. For example, if the frequency divider 43 is a system which will divide by 5, then the extended portions 73a of the graduations in Figure 13 will appear on every 5th one of the graduations produced by the exposure of the plate 42 by the lamp 8c. It will be obvious that an additional means similar to that comprising the elements between the selector switch 44 and the mirror 49, but connected to a different divider, can be employed to produce additional prolongations 74a of the graduations already obtained by the system just described.

As another procedure, I may index a series of graduations by exposing first the normal areas 72; shifting the aperture 39b of Figure 9 to a position corresponding to that of the extended portion 73a of a graduation 72a; third, selecting a different dividing ratio; and fourth, exposing a new series of areas to obtain prolongations 73a of graduations 72a. It will be obvious that the above-described system for obtaining exposures which are co-radial will have to be employed in order that the extended portions 73a are properly aligned with the graduations 72a. It will be obvious that if additional indexing is desired, additional exposures can be made at lower frequencies in order to accomplish the desired result.

Thus far I have discussed in detail only those means which pertain to producing divisions as such upon a rotating disc. As discussed heretofore, variable-opacity wave form representations of the type illustrated in Figure 14 may be produced by synchronizing a harmonic synthesizer with the pulses produced by a generator such as 5a, Figure 7. The graduations 72b in Figure 14 correspond to a pulse frequency with which the cycles 72c, 72d, etc. of a desired wave form are synchronized.

Harmonic synthesizer

In the synthesizer, I use a method of the pulse-sampling type. Although systems employing this general method are described in an article entitled "Method for Changing Frequency of a Complex Wave" in the Proceedings of the National Electronics Conference, Chicago, Illinois, 1946, I prefer to use a diode system together with means for controlling of amplitude and phase of the harmonics with respect to the fundamental frequency, which I believe is novel, in order that I can meet objects of my invention pertaining to the provision during one revolution of a disc, or the like, of an integral number of cycles of various wave forms.

Figure 15:
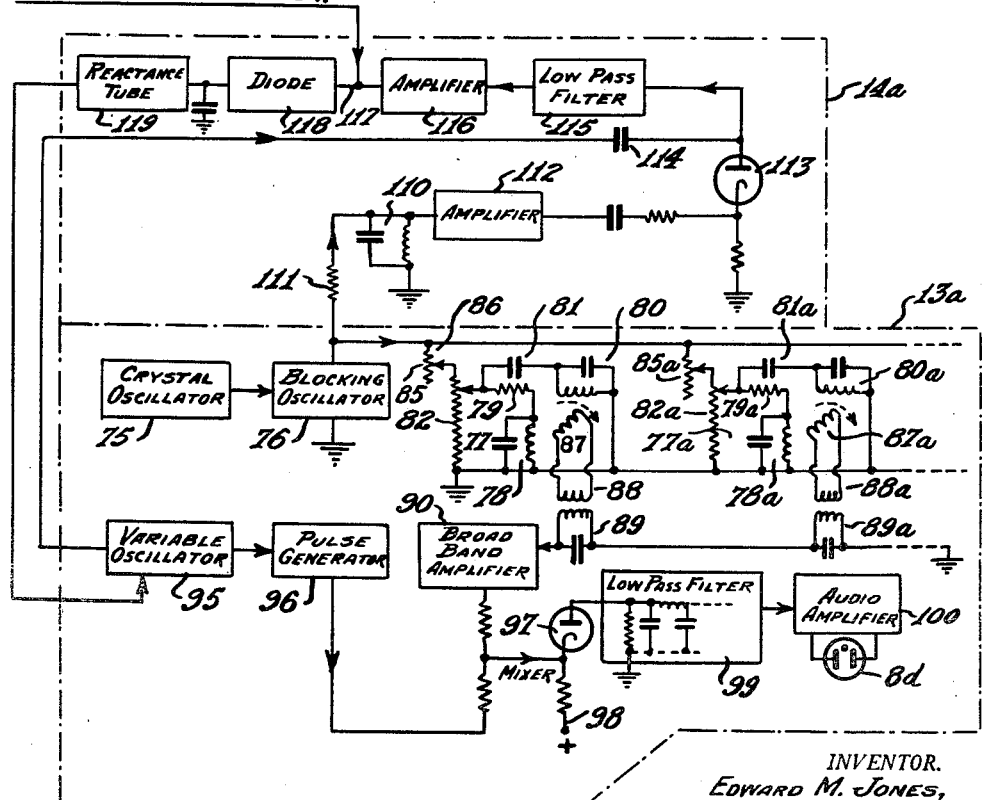
Figure 15 is a diagrammatic representation of a harmonic synthesizer and a synchronizing circuit therefor.

The harmonic synthesizer, represented by the block 13 of Figure 2, is shown in greater detail in the area surrounded by the dot-dash line 13a of Figure 15. The synchronizing circuit enclosed in the area 14a will be described in detail below in another section.

In Figure 15, a crystal oscillator 75, generating a relatively high-frequency signal of the order of 100 kilocycles per second, is connected to a pulse generator or a blocking oscillator 76 for control of the oscillation frequency thereof at a frequency equal to or a submultiple of the crystal oscillator. The harmonically-rich oscillations from the blocking oscillator 76 are fed to a series of parallel filters, two of which are illustrated generally at 77 and 77a. The blocking oscillator output enters each filter through a series resistor, such as 85, 85a, etc. The complex potential is fed therefrom to one tuned circuit 78, 78a, in each filter through a resistor 79, 79a and to another tuned circuit 80, 80a through a capacitor 81, 81a. The two tuned circuits 78 and 80 of filter 77 are tuned to the fundamental frequency of the blocking oscillator output; the tuned circuits 78a and 80a of the filter 77a are tuned to the second harmonic of the blocking oscillator output; and so on. The axes of the inductive elements of the tuned circuits 78 and 80 are 90 degrees apart and their respective voltages are 90 degrees apart, so that when a pick-up element 87 is rotated, the phase of the induced E.M.F. is shifted with respect to the blocking oscillator output, hence with respect to other harmonics derived from other filters, such as 77a. The amplitude of the E.M.F. in 87 can be controlled by the potentiometer 82. The purpose of the resistor 85 is to provide means for adjusting the maximum amplitude of the E.M.F. derived from the pick-up element 87. The capacitors 81, 81a may be varied to match the resistors 79, 79a in equalizing the E.M.F. induced in 87 in its various positions of rotation.

The inductive elements 88, 88a of each filter, in conjunction with the inductive elements 87, 87a, provide link coupling between the filters 77 and 77a, respectively, and tuned pick-up circuits 89, 89a. These tuned circuits are connected in series as shown so that the resultant output may be fed to a broad-band amplifier 90, capable of passing the highest desired harmonic of the blocking oscillator output. Means is thus provided for combining and amplifying harmonically-related E.M.F.'s in different amplitudes and phase relationships for the production at the frequency of the blocking oscillator 76 of complex oscillations of any desired wave form.

Now comes the problem of changing the frequency of the wave thus produced to a desired frequency without changing substantially its harmonic content. I accomplish the change by the general method hereinbefore referred to.

A variable oscillator 95 determines the frequency of pulses generated by a pulse generator 96. This frequency is preferably variable throughout a range such that the difference between it and that of the blocking oscillator 76 may be varied from zero to whatever maximum fundamental frequency it is desired to produce from the synthesizer. Negative pulses from the generator 96 are mixed with the complex wave output from the broadband amplifier 90, as shown, and are fed to the cathode of a vacuum diode 97, which cathode is maintained at a positive potential with respect to ground by suitable means connected at 98. Since the plate of the diode 97 is at ground potential, except when current is flowing therethrough, the diode will conduct whenever the cathode is driven negative. Consequently, if the relationship between the complex wave, the positive bias and the pulse are such that the pulse drives the cathode negative during each pulse occurrence, the pulses of current through the diode 97 will be "samples" of the complex wave, taken at a slightly different point in each cycle of the complex wave. Providing a low-pass filter 99 greatly attenuates the pulse frequency, its harmonics and frequencies as low as one-half the pulse frequency and providing the harmonics of the difference frequency wave are less than one-half the pulse frequency, then the output of the filter will contain only the desired difference frequency and its harmonics and will be of substantially the same wave form as the original complex wave.

The wave thus produced may be amplified by an amplifier 100 and employed to modulate a crater lamp 8d or the like for the purposes discussed herein.

It will be obvious, however, that the synthesizer itself has utility other than that discussed herein. For example, the output may be connected to an oscilloscope and to an electro-acoustic translating system for demonstrating the sound of various complex waves.

Synthesizer synchronizing system

In order to produce an integral number of cycles of a desired wave form during one revolution of a turntable or the like, so that a wave form or voice disc can be produced for use in a photoelectric musical instrument, it is necessary that the synthesizer used to produce a desired wave form be synchronized with the motor driving the turntable.

Since I have already described a system by means of which I can produce one revolution of a turntable during the occurrence of an integral number of periodic electric pulses, it will be obvious that if I synchronize the desired wave with the pulses, an integral number of cycles of a desired wave form may be produced during one revolution. The essential elements of a system for accomplishing this result are shown in the area enclosed by the line 14a in Figure 15. What I do is to compare the frequency of pulses from a pulse generator, such as 5a in Figure 7, with the difference between the fundamental frequency of the blocking oscillator 76 and the frequency of the variable oscillator 95. If they are not the same, I vary the frequency of the variable oscillator 95 until they are the same, employing the following means: Referring to Figure 15, an L—C circuit 110, tuned to the fundamental frequency of the blocking oscillator 76, is connected as shown through a resistor 111 to the blocking oscillator. The voltage across circuit 110 is fed through an amplifier 112 to the cathode of a vacuum diode 113 as shown. To the plate of the diode 113, through a small coupling capacitor 114, is fed a square wave from the variable oscillator 95. The resultant wave at the plate of the diode 113 is fed through a low-pass filter 115 similar to filter 99. The output of the filter 115 is a sine wave at the difference frequency between the fundamental of the blocking oscillator 76 and the variable oscillator 95. After amplification by an amplifier 116, the sine wave is mixed at the point 117 with the pulses with which the synthesizer is to be synchronized, and fed through a diode circuit 118 used to bias a reactance tube 119. If there is a difference between the pulse frequency and the difference frequency mixed at 117, the phase shift causes the direct current level biasing the reactance tube to change and to vary the impedance offered by the tube across the tuned circuit of the variable oscillator 95 until the difference is zero.

Thus, means have been provided for producing an integral number of cycles of a desired wave form during a revolution of a turntable or the like. It will be obvious then that I may employ this system in the production of voice discs of the type described in my copending application entitled Method and Means for Producing Tones and Voices Photoelectrically, Serial No. 117,239, filed September 22, 1949, now Patent No. 2,576,759. Such voice discs have a plurality of substantially radial series of wave form patterns corresponding to the respective tone colors of a photoelectric musical instrument. Each series contains one or more cycles of a wave form for each concentric series of scanning slots in a rotating pitch disc. It will be obvious also that in order to provide wave form patterns whose individual cycle lengths are exactly equal to the distance between scanning slots, it will be necessary to produce during one revolution of the disc upon which the wave forms are exposed a number of cycles equal to the number of scanning slots in the corresponding series on the co-operating pitch disc. In the production of a wave form disc, I may mask that portion of the disc which is not to be exposed, leaving a space equal to a desired number of cycles for exposure by a light source whose intensity is varied in accordance with the desired wave form, or I may expose a complete circle of wave form patterns, using them as a master from which I make my wave form disc by exposure through the master of a desired number of cycles.

It will be obvious to those skilled in the art that the successful production of equally and accurately spaced narrow graduations produced by the methods described above will be dependent upon maintaining an exact ratio between the high-frequency oscillations and a revolution of the turntable moving at a constant speed.

In Figure 16 is illustrated a constant speed motor for driving the turntable. The rotor element 124 of the synchronous motor having an axle 125 is journaled for rotation by ball bearings 126 and 127 in a stator element 128 mounted to a rigid support 129 by screws such as 130. The internal surface of the rotor 124 and the external surface of the stator 128 have equal numbers of rectangular shaped teeth such as indicated at 131 and 132, respectively. The windings 133 and 134, to which the pulsating direct current is supplied, are located in the stator as shown. The turntable 12b is mounted upon the top face of the rotor element 124 by means of screws such as 135. In order to reduce hunting in the turntable to a minimum, the turntable comprises a plate equipped with bosses 136 surrounded by a tubular member 137, preferably a standard bicycle tire which is filled with a viscous liquid such as glycerine as at 138. As is known in the art, the liquid-filled member 137 acts as a viscous damping means for reducing to a minimum periodic departures from synchronous speed caused by the rotor 124 hunting about its synchronous position with respect to the stator 128.

If there are any minor inaccuracies in the construction of the motor which tend to produce periodic departures from synchronous speed once during each revolution, a means must be provided to compensate for such departures; otherwise, cumulative departures of graduations produced by means of the motor and a flashing light would result. I have shown such a means in Figure 16, wherein a spring member 139 is supported under tension between a fixed pin 140 and a peg 141 eccentrically mounted to the axle 125 by an element such as the disc 142. It will be obvious that the peg 141 will be located at such a point and that the spring of 139 will be of such strength as to counteract the acceleration and deceleration caused by the mechanical inaccuracies referred to above. Should the mechanical inaccuracies result in departures from synchronous speed which are not of a simple nature, a cam-actuated system may be employed to compensate for the complex variations.

I have, as mentioned above, produced a circular trace on the tube T8 of Figure 7 for convenience in counting markers or pips for ascertaining dividing ratios between the low and high frequency oscillations. It will be obvious, however, that a sweep other than a circular one may be employed in such a system as described herein once an approximate ratio has been established. For example, a horizontal trace could be produced in the usual manner, superimposing thereon vertical pips produced by the means shown in Figure 7.

In the description of my invention, I have referred to certain component circuits by names current in the art and readily recognized by the skilled worker. For the purpose of a complete disclosure, I may state that I may employ a phase shift network such as that illustrated in Figure 53, chapter 15 of "Theory and Application of Electron Tubes," by Reich, McGraw-Hill, Second Edition, 1944; and I may employ a "flip-flop" multiple vibrator such as that illustrated in Figure 7, chapter 10 of the same volume and described in connection therewith; that the various pulse generators referred to hereinabove including the so-called "wide pulse generator" may be circuits such as shown in Figure 16, chapter 10 of the same volume; that a blocking oscillator as employed by me may have the construction illustrated in Figure 19, chapter 13, of "Radar System Engineering," edited by Ridenour, McGraw-Hill, First Edition, 1947; and that the amplifier and mixer 26a employed by me embodies a circuit such as two conventional triode amplifiers, the plates of which are connected in parallel to an output circuit, the oscillations to be mixed being fed to the respective grids of the triode amplifiers.

*Synchronizing system applications*

Figure 17:
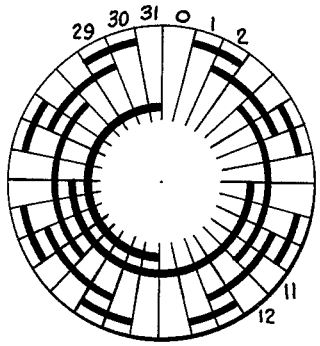
Figure 17 is a representation of a code wheel disc.

The complete system for graduating a circular path presented in Figure 7 has been described as being applied to the manufacture or preparation of graduated discs suitable for electronic musical instruments. The same system, together with suitable modification of the means for controlling the light source impinging upon the circular disc, may be employed for the production of coding devices or code discs such as the code wheel illustrated in Figure 17. The code wheel represented by Figure 17 is a five digit cyclic binary code disc. Such disc has five circular black and white patterns in concentric paths, and the disc is rotated about its axis. To utilize the code disc, five photocells pick up the light from these patterns through a stationary radial slit so that each photocell is aligned with a different one of the concentric paths. These photocells recognize only two conditions: (1) more light than a certain threshold, and (2) less light than a certain threshold. The apparatus shown in Figure 7 can be used to produce more complicated or versatile code discs such as one having fifteen binary digits, and hence would have fifteen concentric circles having black and white patterns therein. From the center or innermost circular path, the paths tend to contain more and more black and white patterns as is indicated by the representation in Figure 17. Thus, with a fifteen binary digit code wheel it is possible to obtain 32,768 combinations of signals. This combination of signals theoretically may be used to determine the position of the shaft carrying the code wheel to an accuracy of ±20 seconds of an arc. To provide an indication approaching such accuracy, it is necessary to produce a pattern on the code wheel by means of a good microscopic lens to form an image on a photographic plate.

The accuracy requirements for defining the ends of the black portion of each of the patterns could be described in terms of an accuracy of ±.00013 inch with a radius of 2½ inches. Thus, the practical production is obtained by producing one circle at a time, and thereupon moving the microscopic lens and light source to a new position to expose a second path. Figure 18 is a circuit diagram showing the application of the apparatus heretofore described when used for producing code discs.

In Figure 18, there is shown the turntable 12B similar to 12A of Figure 7 provided with a tubular member 137 filled with a viscous liquid 138, as illustrated in Figure 16. The motor 50 is energized from a power amplifier 56A. The turntable 12B is provided with a capacity pick-up C12 which provides one pulse per revolution of the turntable. The turntable 12B is provided with a suitable support member 151 for holding the code plate negative 152. In place of the representation of the lens 40 and 41 of Figure 7, there is illustrated in the present instance a set of lenses 40b and 41b. For convenience in setting the microscope, there is provided a beam splitting prism 153 and a suitable eye piece and lens 154. Modulated light is transmitted through the microscope objective and lenses including the lenses 40b and 41b from a silvered reflecting prism 155. The light supplied to the prism 155 is obtained from a high intensity source of illumination comprising a lamp 156, which is known as Type BH–6 manufactured by General Electric Company. This is a high pressure mercury vapor lamp energized from a suitable high voltage supply, not shown. Light from the lamp 156 passes through an aperture 157, through a lens 158, and thence through a Nicol prism 159. Passage of light from the Nicol prism 159 to a second Nicol prism 161 is controlled by a Kerr cell 162.

The Kerr cell comprises a pair of electrodes of gold plated nickel closely spaced together by a few thousandths of an inch, immersed in nitrobenzene controlled within a cell. When high potential is applied to the cell, and light entering is polarized at 45° to the direction of the gap between the electrodes, the plane of polarization is rotated 90° as the light passes through the cell. The Nicol prism 161 is so positioned as to block the light when no voltage is applied to the Kerr cell 162. When high voltage is applied to the Kerr cell 162, light passes through the cell and through the second Nicol prism 161 with little attenuation. Light may be modulated in this manner over a ratio of at least 1000 to 1. Modulation of the light source for exposing the code plate negative 152 is synchronized to the rotation of the turntable 12B by obtaining the pulses for driving the motor 50 and the square wave for modulating the light from frequency dividers operating from a single master oscillator. The master oscillator 1C is tuned to a frequency of 512 kilocycles.

The master oscillator 1C supplies energy to a frequency divider 4F which divides the frequency by four. A portion of the energy thus divided is supplied to another frequency divider 4G which divides the incoming frequency by 256. The output of the frequency divider 4G is supplied to another frequency divider 4H. The frequency divider 4H again divides the input frequency by two to supply to the power amplifier 56 250 pulses per second each having a duration of 1,700 microseconds. It, of course, will appreciated that in this application the oscillator 1C could have been provided with a range of frequency one-fourth as great as that originally provided, although this was the frequency range of the variable frequency oscillator employed in the circuit of Figure 7.

A portion of the output of the frequency divider 4F, which receives energy from the variable frequency oscillator 1C, is supplied to a series of sixteen flip-flop circuits each having the characteristic of dividing the input frequency by two, which are identified as flip-flop dividers 4I through 4X. The outputs of the flip-flop dividers 4I through 4X are connected to the contact point of a selector switch S17 which is connected to an amplifier 16 which controls the application of high voltage to the Kerr cell 162. It will be noted that each of the flip-flop circuits 4I through 4X is provided with a suitable switch connected to terminals marked + and —. Each of the flip-flop circuits 4 is arranged to flip or flop on the rising edge of the output of a preceding divider. The position of the switches S1 through S16 determines what action will result in the particular flip-flop circuit. When any one of the switches has its arm on the positive terminal, the corresponding divider will flip over to or remain in condition of most positive output whenever the reset pulse comes along. If, however, the switch is connected to the negative terminal, the opposite condition will be brought about. Thus, all of the switches S1 through S16 are connected to a common conductor 163 which is connected to a blocking oscillator 5B which is controlled by the mixer 26B. The mixer 26B receives 500 pulses per second from the divider 4G, where each pulse coincides with the rising edge of the 128 kilocycle square wave supplied from the divider 4F to the first flip-flop circuit 4I. The mixer 26B receives a capacity pick-up of one pulse per revolution of the turntable 12B from the capacitor C12A, which is modulated onto the 500 pulses per second to produce an action by the blocking oscillator which transmits one reset pulse per revolution. Each reset pulse is a pulse of two microseconds duration.

The operation of the frequency dividers 4I through 4X is relatively simple, and hence it is believed that this will be readily understood by those skilled in the art. It is only necessary to obtain from them a number of square wave modulation patterns equal to some power of two for each circle to be exposed on the code plate 152. If the flip-flop circuits 4I through 4X were merely synchronized one from the other, different phase relationships would be obtained every time the equipment were turned on. However, by the use of a reset pulse obtained from the blocking oscillator 5B, each one of the flip-flop circuits 4I through 4X is set to the correct starting condition once during every revolution of the turntable 12B. The blocking oscillator 5B has a low impedance winding on a transformer which is connected in series with one plate circuit of each flip-flop circuit by means of the switches S1 through S16. While not shown in the diagram of Figure 18, there actually is another connection from each switch S1 through S16 which connects the other plate circuit of each flip-flop directly to the positive terminal of anode potential.

To obtain a straight binary code, the reset switches S1 through S16 would all be connected to the negative position, and the switch 17 would be set to select the particular square wave with the particular frequency for modulating the light for a particular zone in the code plate 152. For a binary code such as that shown in Figure 17, the inner zone is likewise set up in a similar manner, but each of the other zones must be advanced by one-fourth cycle. This is accomplished by moving the reset switch associated with the divider from which the output is taken and the one associated with the preceding divider to the + or positive terminal, and leaving all the other previous switches set to the negative terminal. For example, for the fourth zone of a fifteen digit code, S17 would be set to receive energy from flip-flop circuit 4L, and switches S4 and S3 would be set to the positive terminal while switches S1 and S2 are set to the negative terminal.

It should be noted that the reset pulse obtained from the blocking oscillator 5B occurs at a point where normally no transition takes place in the wave form produced by the dividers 4I through 4X, except in the case of the first divider where a negative transition would normally occur at the same time. The reset pulse must be strong enough to counteract if necessary any trigger pulses from previous stages which might initially occur simultaneously or slightly preceding the reset pulse. If all the reset switches were set to the negative terminals, all the flip-flop circuits would flip positive in quick succession upon the arrival of the reset pulse. But since the switch S3 is set to positive, its flip-flop circuit 4K will go negative shortly after the initial edge of the reset pulse has arrived, and hence the flip-flop circuit 4L will not make a transition until one-half cycle later in terms of the output wave of the flip-flop circuit 4K.

In actual operation of the various flip-flop circuits there could be a delay averaging about 8/10 of a microsecond per stage which, however, is readily compensated for by suitable means.

*Another application of the synchronizing system*

In attempting to obtain extreme accuracy in locating the leading and trailing edges of the black areas of the code disc shown in Figure 17, it was found that the synchronous motor was subject to some hunting and drift due to changes in bearing friction. It furthermore was found necessary to use a relatively heavy turntable together with the fluid mass in the tube 137 to filter out the pulsating forces of the motor. It, therefore, is proposed to drive the turntable at a fairly constant speed and to provide at the periphery of the turntable a reference pattern containing a number of equally spaced divisions equal to the number of quanta in the code it is desired to reproduce. For binary codes with fifteen digits or less, a circle of 32,768 divisions is provided. For other possible codes which it might be desired to reproduce, circles containing 36,000, 32,000, 25,600, 21,600 and 20,000 divisions are included with a provision for moving a photocell to pick up a signal from anyone of these circles.

A modified system therefore has been employed such as that shown in Figure 19. Herein, a turntable 12C is provided with an aluminum rim 164 which is driven by a two phase alternating current motor 165. The outer edge of the turntable 12C carries an annular plate 166 provided with the necessary divisions to serve as a reference pattern and for obtaining a reset pulse for each revolution of the turntable 12C. A photocell 167 reveices light from a lamp 168 placed above the reference circle 166. The reference circle comprises 32,768 black areas separated by equal width white areas. Between the lamp 168 and the reference circle 166 there is interposed a section 169 having the same pattern thereon. Thus, light passes through a plurality of the white areas to the photocell 167. By permitting the light to pass through a number of such white areas at a time, the effect of dust on the reference plate is reduced. The signal from the photocell 167 is supplied to an amplifier and limiter 171 which produces a constant amplitude square wave capable of synchronizing a series of flip-flop circuits 4I through 4X.

By means of a photocell 172, a lamp 173 and an area 174, there is obtained a reset pulse from a separate track on the annular support 166. This track is all black, except for a narrow radial slit. The photocell 172 picks up the light pulse which is amplified by an amplifier 173 to control a blocking oscillator 174. The pulse from the blocking oscillator is transmitted through the conductor 175 to the switches S2 through S16. Thus, the pulse derived from the blocking oscillator 174 performs the same function as the reset pulse obtained from the blocking oscillator 5B of Figure 18. The switch 17 selects from the various flip-flop circuits the desired frequency to control a wave shaper and amplifier 176. The wave shaper and amplifier 176 controls a ribbon modulator having two ribbons A and B diagrammatically indicated in Figure 19. The ribbons A and B serve as a light valve in a path from an incandescent light source 177 which includes a lens 178, a beam splitting prism 179 and a final set of lenses 181. The beam splitting prism provides light for an eye piece 182 for physical observation of the image in setting up proper operation of the apparatus.

A portion of the output of the amplifier and limiter 171 is supplied to a discriminator 183 provided with a speed control 184 to supply energy to a motor control amplifier 185 which energizes the two phase alternating current motor 165.

It will be noted that the light modulating system of Figure 19 is somewhat different from the Kerr cell employed in Figure 18. The modulator illustrated in Figure 19 consists of a permanent magnet structure and of two ribbons of duralumin stretched tightly parallel to each other in an air gap, so that they move laterally together or apart when current is passed through them. Each ribbon can be deflected .0005 inch for any cycle without damage at a velocity of about up to 25 inches per second. These ribbons have an advantage over other modulators that they can form the actual slit that is imaged on the photographic plate by the miscroscope lens. Further, by having the ribbons move during each transition at a speed corresponding to the circumferential speed of the photographic plate, one of the ribbons can be arranged to instantaneously be stationary with respect to the plate, thus producing a very sharp image even though the slit becomes considerably wider than could be tolerated with other modulation systems.

Figure 20:
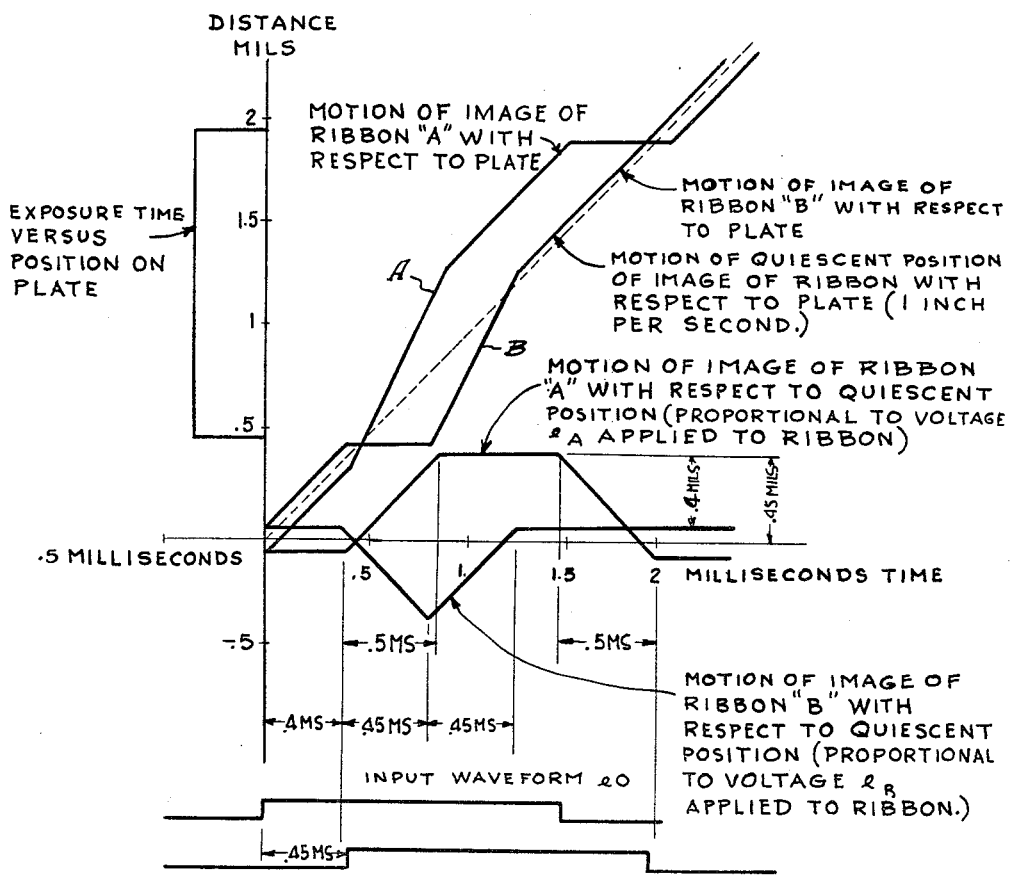
Figure 20 is a graphical explanation of the light modulating apparatus.

This action of the ribbons and the light modulator is diagrammatically illustrated in Figure 20. Normally, the two ribbons are just barely crossed with no applied current, and it is assumed that the photographic plate is moving at the rate of one inch per second. Initially, a small reverse current is supplied to the ribbons to make them overlap slightly. After the rising edge of the square wave input voltage $E_0$ arrives, there is a delay of the order of .4 microsecond. Then the ribons are caused to move apart at such rate that the images move one inch per second, which means that one of the ribbons is temporarily stationary with respect to the plate. After .45 millisecond, one of the ribbons starts moving back to its original position, but the other ribbon remains stationary. When the trailing edge of the square wave input wave form $E_0$ arrives, the latter ribbon begins to move back to its original position at such speed that its image is temporarily stationary with respect to the plate. From the relation shown in Figure 20, it should be apparent that the motion of ribbon A and ribbon B with respect to the photographic plate is that shown by the curves A and B, and that by taking the horizontal difference between these two curves the exposure time vs. position can be plotted. This comes out to be a perfect square wave. This wave form theoretically corresponds to that which would be obtained by using an infinitely narrow slit in conjunction with a Kerr cell, but the amount of exposure corresponds to that which would be obtained with a .4 mill slit used in conjunction with a perfect light modulator.

From the foregoing, it is apparent that Figure 18 shows an arrangement for driving a turntable with a photographic plate to be exposed by a precision synchronous motor which is energized by the signal synchronized to a master oscillator, the master oscillator also synchronizing a code generator circuit which modulates a light source projected onto the code plate negative. The arrangement shown in Figure 19 drives the turntable at an approximately constant speed, and photoelectrically derives a signal from the reference pattern on the turntable and uses the signal to synchronize the code generator circuits which modulate the light source. The latter system has an advantage in that there is no drift in phase of a synchronous motor which could produce angular errors between the various circles of the code, and also that the turntable can be operated at a slower speed permitting the use of a ribbon light valve modulator which is considerably more efficient than other presently available light modulators. There is also a possibility of converting the apparatus shown in Figure 19 into a system similar to one employing a synchronous motor, by utilizing a servosystem which keeps the signal from the reference pattern in step with a sub-multiple of a master oscillator.

While for the purpose of illustrating and describing my invention certain arrangements have been shown in the drawing, it is to be understood that my invention is not to be limited thereby since what I claim as new and desire to secure by Letters Patent is defined in the accompanying claims.

I claim as my invention:

1. A device for illuminating sectors of a turntable comprising a turntable, means connected to the turntable for rotating the turntable including a periodic current power source, a source of pulses for producing an integral number thereof for each revolution of said turntable, means for synchronizing said periodic power source with said pulse source, means for generating a reset pulse during each revolution of said turntable, a source of light focused upon said turntable, and means including a plurality of flip-flop circuits arranged in cascade for controlling the impingement of light on said turntable in accordance with said source of pulses, said reset pulse being supplied to said flip-flop circuits to restore them to a predetermined state.

2. A device for illuminating sectors of a turntable comprising a turntable, electric means connected to the turntable for rotating said turntable including a source of low-frequency alternating current, a source of oscillations, means for synchronizing the frequency of the oscillation source with the speed of rotation of said turntable, a plurality of flip-flop circuits arranged in cascade and controlled by said source of oscillations, means for selecting the output of one of said flip-flop circuits, a source of light adapted to impinge upon a portion of said turntable, and means connected to the output selecting means for controlling the impingement of said light on the turntable.

3. A device for illuminating sectors of a turntable comprising a turntable, means connected to the turntable for rotating the turntable including a low-frequency electric power means, a source of oscillations synchronized with the speed of rotation of said turntable, a plurality of flip-flop circuits arranged in cascade and energized from said source of oscillations, means for selecting the output of one of said flip-flop circuits, a source of light adapted to impinge upon a selected portion of said turntable, means for controlling the impingement of said light in accordance with the selected output of one of said flip-flop circuits, and pulse means responsive to the rotation of said turntable for initiating operation of said flip-flop circuits.

4. A device for illuminating sectors of a rotatable surface comprising means for rotating the surface about an axis, including electric driving means a source of oscillations, means for energizing said electric driving means from said source, means for deriving pulses from said oscillation source, a plurality of flip-flop circuits connected in cascade, each circuit having switching means for predetermining its mode of operation, said circuits being connected to receive said pulses, means for modulating light in accordance with the operation of a selected flip-flop circuit, and means for directing modulated light on said surface.

5. A system for dividing a path on a photosensitive member into a selected number of parts comprising a surface rotatable about an axis, a photosensitive member carried by said surface, electric means for rotating said surface, a source of oscillations, means for energizing said electric means from said source of oscillations, means for deriving a series of pulses from said source of oscillations, a plurality of flip-flop circuits connected in cascade, each circuit being arranged to divide in half the frequency of its received pulses, each circuit having switching means for predetermining one of two modes of operation, said cascaded circuits being connected to said pulse deriving means, electromechanical means for modulating light in accordance with the operation of a selected flip-flop circuit, and means for directing modulated light on a path on said photosensitive member.

6. A system for dividing a revolving photosensitive surface into an equal number of parts comprising electric means for driving said surface, a source of oscillations, a series of flip-flop circuits each arranged to reduce the frequency of received oscillations, said series of circuits being connected to said source of oscillations, means including a control signal source connected to each flip-flop circuit through a switch controlling the operation of each of said flip-flop circuits in accordance with said control signal, said control signal source generating said control signal for said circuits in accordance with the rotational position of said surface, a source of light, means for modulating said light in accordance with the operation of one of said flip-flop circuits, and means for directing modulated light onto said photosensitive surface.

7. A system for dividing a path on a photosensitive surface into an equal number of parts comprising a surface rotatable about its axis, electric means for driving said surface, a source of pulses, a series of flip-flop circuits each arranged to reduce the frequency of received pulses, said series of circuits being connected to said source of pulses, a switch for each flip-flop circuit for predetermining the operation thereof in accordance with a received control signal, means for generating a control signal for said flip-flop circuits in accordance with each revolution of said surface, switching means for selecting one of said flip-flop circuits, a source of light, means for modulating said light in accordance with the operation of said selected flip-flop circuit, and means for directing modulated light onto said photosensitive surface.

8. A system for dividing a path on a photosensitive surface into an equal number of parts comprising a photosensitive surface rotatable about its axis, a source of pulses, a plurality of flip-flop circuits arranged in cascade, each flip-flop circuit operating to reduce the frequency of received pulses, said circuits being connected to said source of pulses, a switch for each flip-flop circuit for predetermining the mode of operation thereof in accordance with a received control signal, means for generating in accordance with the rotation of said surface a control signal for said flip-flop circuits, a source of light, ribbon modulator means for modulating said light in accordance with the operation of a selected flip-flop circuit, and means for directing modulated light in a path onto said photosensitive surface.

9. A system for dividing a path on a photosensitive surface into a number of parts comprising a circular surface rotatable about its axis, said surface being provided with a peripheral reference pattern, means for deriving a periodic wave form from said reference pattern, a plurality of cascaded flip-flop circuits energized by said periodic wave, means for deriving a pulse for each revolution of said circular surface, said pulse being supplied to said flip-flop circuits to initiate operation thereof, means for modulating light in accordance with the output of a selected one of said flip-flop circuits, and means for projecting said modulated light onto a path on said photosensitive surface.

10. A system for dividing a path on a circular photosensitive surface into a number of parts comprising means for rotating said surface about its axis at a substantially constant speed, said surface being provided with a peripheral reference pattern, means for deriving a periodic generally rectangular wave form from said reference pattern, a plurality of cascaded flip-flop circuits energized by said periodic wave, means for deriving a pulse for each revolution of said crcular surface, means for supplying said pulse to said flip-flop circuits to initiate operation thereof, means for modulating light in accordance with the output of a selected one of said flip-flop circuits, and means for directing modulated light onto a path on said photosensitive surface.

11. The combination comprising a circular photosensitive surface, means for rotating said surface about its axis at a substantially constant speed, a peripheral reference pattern carried by said surface, means for deriving a periodic generally rectangular wave from said reference pattern, a plurality of cascaded flip-flop circuits energized by said periodic wave, a switch for each flip-flop circuit for predetermining the mode of operation thereof, means for deriving a pulse for each revolution of said circular surface, means supplying said pulse to said flip-flop circuits to initiate the predetermined mode of operation thereof, and means for projecting light modulated in accordance with the output of a selected one of said flip-flop circuits onto said photosensitive surface.

12. A system for producing in a path of predetermined length on a photosensitive surface of a base member a predetermined number of discrete exposed areas, comprising the combination of mechanical means supporting said member and causing said path to be moved at least during an exposure period for said photosensitive surface, an optical system fixed with respect to the direction of motion of said member during said exposure, said optical system including means for producing successive cycles of light and means for focusing said light on said surface so as to cause cyclic exposure of successive areas in said path during its movement, and synchronizing means interconnecting said optical system and said mechanical driving means for producing during the passage of the predetermined length of said path by said optical system a number of cycles of light equal to said predetermined number of exposed areas including a track of alternating opaque and transparent sectors carried by the mechanical supporting means and a photoelectric pickup operatively associated with said track.

13. The combination claimed in the preceding claim 12, including means for producing a second predetermined number of discrete exposed areas in a predetermined length in a second path on said member and phasing means for physically relating said exposed areas in said second path to said exposed areas in said first path.

14. A system for producing a series of a given integral number of cyclical patterns on a moving member within a predetermined dimension, which system comprises a variable frequency source of relatively high-frequency oscillations, a source of relatively low-frequency oscillations, a synchronizing circuit coupling said sources for synchronizing the oscillations produced thereby by any one of a wide range of consecutive integers, a synchronous motor coupled to said low-frequency source and driving said member at a speed proportional to the frequency of said low-frequency oscillations, and radiant energy modulating means for producing on said moving member the said integral number of cyclic patterns at a rate determined by the frequency of said high-frequency source, said means being coupled to the said high-frequency source.

15. The system claimed in claim 14 including a frequency divider coupled to said high-frequency source for dividing the frequency of the output thereof by consecutive integral powers of a desired dividing ratio, the frequency of the oscillations from said high-frequency source being variable over a range of at least said dividing ratio to one.

16. The system claimed in claim 14 wherein said radiant energy pattern producing means includes a pulse generator coupled to said high-frequency source, a radiant energy source coupled to said pulse generator, and energy directing means cooperating with said radiant energy source for producing the said patterns.

17. The system claimed in claim 14 wherein the said radiant energy pattern producing means includes a pulse generator coupled to said high-frequency source, and wave form producing means coupled to said pulse generator, the characteristics of said patterns being determined by said wave form producing means.

18. A system for producing on a wave form member a plurality of series of wave form patterns, each series having a desired number of patterns within a desired dimension and each series having desired phase relationships with respect to a common reference line, which comprises a source of relatively high-frequency oscillations, a source of relatively low-frequency oscillations, a synchronizing circuit coupling said sources for locking the frequency ratio thereof in an integral relationship, a frequency divider coupled to said high-frequency source for dividing the frequency of the output thereof by consecutive integral powers of a desired dividing ratio, the frequency of said high-frequency source being variable over a range of at least said dividing ratio to one, a pulse generator coupled to said divider system, means coupled to said pulse generator for producing said wave form patterns, a synchronous motor coupled to said low-frequency source for moving said wave form member at a speed proportional to the frequency of said low-frequency source, a cathode ray tube circuit coupled to said low-frequency source for producing a trace on a cathode ray tube at the frequency of said low-frequency source, said cathode ray tube circuit being connectable to said pulse generator for the introduction of markers upon said trace for ascertaining certain dividing ratios between the respective frequencies of said pulse generator and said low-frequency source, there being a connection between said low-frequency source and said cathode ray tube circuit for the introduction of one marker per cycle of the low-frequency, means for intensifying said trace for not more than one cycle of said low-frequency oscillations at a predetermined position of said wave form member, and circuit means including a switch in connection with said synchronizing circuit for momentarily disconnecting said synchronizing circuit, whereby the phase of the synchronization may be shifted by observation of said markers on said cathode ray tube.

19. The system claimed in claim 18 wherein said wave form pattern producing means comprises a harmonic synthesizer being coupled to said pulse generator through a circuit for synchronizing the synthesizer with the output of said pulse generator.

20. A synchronizing system comprising a low-frequency oscillator, means for producing at a rate proportional to the frequency of said oscillator recurring waves $a$ varying in amplitude substantially linearly with respect to time during a part of each period thereof, a source of high-frequency pulses $b$ with which said oscillator is to be synchronized, a pulse generator producing pulses $c$ and arranged to be responsive to the first pulse $b$ occurring after the linear portion of a wave $a$ has begun, means for applying waves $a$ and pulses $b$ to said pulse generator, and a pulse-responsive circuit coupling said low-frequency oscillator with said pulse generator and said means producing waves $a$, said circuit being operative upon the occurrence of each pulse $c$ to introduce into said oscillator a phase-shift of a magnitude determined by the amplitude of the linearly varying portion of the wave $a$ at the instant each pulse $c$ occurs, thereby shifting the phase of the low-frequency oscillations into synchronism with high-frequency pulses $b$.

21. A synchronizing system comprising a low-frequency oscillator producing a sinusoidal output wave, a pulse producing circuit coupled to said oscillator for producing sloping front pulses $a$ at the frequency of said oscillator, a source of high-frequency periodic pulses $b$, a relaxation oscillator producing upon excitation pulses $c$, circuit means connecting said circuit producing pulses $a$ and said source producing pulses $b$ with said relaxation oscillator so that said relaxation oscillator is responsive to the first of said pulses *b* occurring after each of said pulses *a* has started, and a pulse-responsive circuit connecting said relaxation oscillator producing pulses *c* and said circuit producing pulses *a* with said low-frequency oscillator for introducing a phase-shifting step into each cycle of the normally sinusoidal wave, said step being derived from the combined effects of a pulse *c* and the instantaneous amplitude of the sloping front of a pulse *a* at the instant the pulse *c* occurs, the magnitude of the step thus being related to the time difference between said pulse *a* and said pulse *b* thereby to alter the output wave frequency of said low-frequency oscillator to a value which is an exact sub-multiple of said high-frequency pulses.

22. A system for producing on a moving recording member a series of cyclical patterns corresponding to a synthesized wave form, comprising the combination of a source of relatively high-frequency oscillations, a source of relatively low-frequency oscillations, a synchronizing circuit coupling said sources for synchronizing the oscillations produced thereby, a synchronous motor coupled to said low-frequency source and driving said member at a speed proportional to the frequency of said low-frequency oscillations, a pulse circuit coupled to said high-frequency source for producing pulses at a rate proportional to said high-frequency oscillations, and a harmonic synthesizer coupled to said pulse circuit for producing said synthesized wave, the fundamental frequency of which equals the frequency of said pulses, and means responsive to said wave form means for producing said patterns on said member.

23. The system claimed in claim 22 wherein said harmonic synthesizer comprises the combination of a source of fixed frequency oscillations, a first pulse generator in connection therewith, the frequency of the pulses generated thereby being determined by said source, a series of filters tuned respectively to the fundamental pulse frequency and its harmonics, said filters including variable impedance means and variable coupling means for controlling respectively the amplitude and phase relationship between said harmonics and the fundamental, a plurality of tuned circuits connected in series and coupled respectively to said filters, a variable oscillator, a second pulse generator generating pulses at a frequency determined by said variable oscillator, a mixer circuit connected between said tuned circuits and said second pulse generator for mixing the resultant voltage of said circuits with the pulses from said second generator, and a low-pass filter operative to attenuate all frequencies above substantially one-half the frequency of the pulses from said first generator.

24. A synchronizing system comprising a low-frequency oscillator, a high-frequency oscillator, means for producing pulses at a rate proportional to the frequency of said high-frequency oscillator, a relaxation oscillator operating at the frequency of the low-frequency oscillator arranged to be responsive to two control pulses, means for supplying such pulses from said low-frequency oscillator and said high-frequency oscillator to said relaxation oscillator, and means responsive to the cyclic operation of said relaxation oscillator to alter the progress of each succeeding cycle of oscillation of said low-frequency oscillator.

25. A synchronizing system comprising a low-frequency oscillator, a variable frequency high-frequency oscillator, means for producing pulses at a rate proportional to the frequency of said latter oscillator, a relaxation oscillator arranged to be responsive to two series of control pulses, means for supplying thereto one such series of pulses from said low-frequency oscillator and means for supplying another series of pulses proportional to the frequency of said high-frequency oscillator, and biasing means responsive to the cyclic operation of said relaxation oscillator to supply a bias voltage to said low-frequency oscillator at the frequency of its oscillations to alter the progress of each succeeding cycle of oscillations thereof.

26. A synchronizing system comprising a low-frequency oscillator, means for producing pulses proportional to the frequency of the oscillations thereof, a variable frequency high-frequency oscillator, means for producing pulses at a rate proportional to the frequency of said high-frequency oscillator, a blocking oscillator arranged to be responsive to two series of control pulses derived respectively from said low-frequency oscillator and said high-frequency oscillator, and biasing means energized by and responsive to the cyclic operation of said blocking oscillator to supply a bias voltage to said low-frequency oscillator for a brief time interval during each cycle to delay the progress of each cycle of oscillations thereof, thereby to alter the oscillation frequency to a value which is an exact sub-multiple of said high-frequency oscillations.

27. A system for producing *n* number of patterns in a circular path comprising a source of high-frequency pulses, a source of low-frequency pulses, a synchronous motor connected to a turntable and energized from said low-frequency pulses, said motor producing a revolution of said turntable in *m* number of low-frequency pulses, means connected to said sources responsive to said high-frequency and said low-frequency pulses from said sources for varying the frequency of one of said sources to produce within one revolution of said turntable *n* number of high-frequency pulses, means for producing a predetermined wave pattern for each high-frequency pulse, and means for recording said wave pattern on said turntable.

28. A system for producing a series of a given number of cyclical patterns on a moving recording member within a predetermined dimensions, which system comprises a source of relatively high-frequency oscillations, a source of relatively low-frequency oscillations, a synchronizing circuit coupling said sources for synchronizing the oscillations produced thereby, a synchronous motor coupled to said low-frequency source and driving said member at a speed proportional to the frequency of said low-frequency oscillations, and means for producing on said moving member the said cyclic patterns at a rate determined by the frequency of said high-frequency source, said means being coupled to the said high-frequency source and producing an integral number of said cyclic patterns during the motion of said member for the said predetermined dimension, said moving member being supported by a massive turntable having damping means mounted concentric therewith, said damping means comprising a circularly arranged tubular element containing a viscous liquid.

29. A system for producing a series of a given number of cyclical patterns on a moving recording member within a predetermined dimension, which system comprises a source of relatively high-frequency oscillations, a source of relatively low-frequency oscillations, a synchronizing circuit coupling said sources for synchronizing the oscillations produced thereby, a synchronous motor coupled to said low-frequency source and driving said member at a speed proportional to the frequency of said low-frequency oscillations, and pattern producing means including a pulse generator coupled to said high-frequency source for producing on said moving member the said cyclic patterns at a rate determined by the frequency of said high-frequency source, said means producing an integral number of cyclic patterns during the motion of said member for the said predetermined dimension, and wave form producing means comprising a harmonic synthesizer coupled to said pulse generator the output of said synthesizer being synchronized with the output of said pulse generator, the characteristics of said patterns being determined by said wave form producing means.

30. The system claimed in claim 29 wherein said harmonic synthesizer comprises the combination of a source of fixed frequency oscillations, a first pulse generator in connection therewith, the frequency of the pulses generated thereby being determined by said source, a series of filters coupled to said first pulse generator and tuned respectively to the fundamental pulse frequency and its harmonics, said filters including variable impedance means and variable coupling means for controlling respectively the amplitude and phase relationship between said harmonics and the fundamental, a plurality of tuned circuits connected in series and coupled respectively to said filters, a variable oscillator, a second pulse generator in connection therewith and generating pulses at a frequency determined by said variable oscillator, a mixer circuit connected between said tuned circuits and said second pulse generator for mixing the resultant voltage of said circuits with the pulses from said second generator, and a low-pass filter coupled to said mixer circuit and operative to attenuate all frequencies above substantially one-half the frequency of the pulses from said first pulse generator.

31. A system for relating the frequency of lower frequency periodic oscillationus by a particular integer to higher frequency periodic oscilllations, which comprises a source of relatively lower frequency oscillations, a source of relatively higher oscillations approximately integrally related to the frequency of said relatively lower frequency source, and a circuit interconnection between said sources acting to produce pulses at a frequency desired as the frequency of said lower frequency source and to apply one of said pulses to each cycle of said lower frequency source to establish an exact integral relationship between the frequencies of said sources, the magnitude of said pulses being directly proportional to the time difference between each period of said lower frequency oscillations and the corresponding number of the periods of the higher frequency oscillations.

32. The structure claimed in claim 31 in combination with means driven by said low-frequency source to cause a path to move past a given point, and means actuated by said high-frequency source to produce a repetitive pattern in said path.

33. The structure claimed in claim 32 including means for generating a periodic wave having a wave form desired in each cycle of said pattern, and circuit means for equalizing the fundamental frequency of said periodic wave with the frequency of said high-frequency oscillations and means for impressing said periodic wave on said pattern producing means.

34. A system for producing a series of indexed graduations on a moving member within a predetermined dimension, which system comprises a variable frequency source of relatively high-frequency oscillations, a source of relatively low-frequency oscillations, a synchronizing circuit coupling said sources for synchronizing the oscillations produced thereby by any one of a range of consecutive integers, a synchronous motor coupled to said low-frequency source and driving said member at a speed proportional to the frequency of said low-frequency oscillations, and radiant energy modulating means for producing on said moving member the said integral number of indexed graduations at a rate determined by the frequency of said high-frequency source, said means being coupled to the said high-frequency source, wherein said radiant energy modulating means includes a pair of pulse generators coupled to said high-frequency source, said pulse generators operating at integrally related frequencies, a pair of radiant energy sources coupled respectively to said pulse generators, and energy directing means cooperating with said radiant energy sources for producing the said indexed graduations.

35. A synchronizing system comprising a source of periodic electric oscillations of a relatively high-frequency, a source of periodic electric oscillations of relatively low-frequency, said low-frequency source including a tuned circuit having a condenser therein determinative at least in part of the frequency of said low-frequency oscillations, and a synchronizing circuit coupling said sources, said synchronizing circuit including a pulse generator coupled to said condenser for introducing a charge into said condenser at least once during each cycle of oscillation of the low-frequency source, and circuit means coupling said high-frequency source with said pulse generator for establishing the magnitude of said charge at a value which is proportional to the immediate difference in time between each period of the low-frequency oscillations and a selected integral number of periods of said high-frequency pulses.

36. A synchronizing device for producing pitch records comprising a substantially constant speed record supporting and moving means, an integral frequency means on said record supporting means comprising a plate mounted on the record supporting means provided with a track of opaque and transparent sectors, a sensing means operatively associated with said frequency means having a light source and photocell disposed on opposite sides of the track, a frequency divider operatively associated with said sensing means, and a signal means operatively connected to said frequency divider, said signal means being located adjacent said record supporting and moving means, whereby when a record is placed on said record supporting and moving means and said signal means is actuated, a desired constant frequency pattern may be recorded on said record.

37. A synchronizing device for producing pitch discs and the like comprising the elements of claim 36 wherein the record supporting means includes a turntable, and the plate of the integral frequency means is mounted coaxially on the turntable, the track being circular and coaxial with the turntable.

38. A device for producing code discs comprising the elements of claim 37 wherein the signal means comprises a light source focused on a portion of the turntable, and means operatively connected to the frequency divider for interrupting the flow of light from the source to the turntable responsive to the output of the frequency divider.

39. A device for producing code discs comprising the elements of claim 38 wherein the means for interrupting the flow of light comprises a ribbon modulator having first and second parallel adjacent ribbons disposed parallel to a radius of the turntable, and means operatively associated with the ribbons for controlling the separation of the ribbons responsive to an electrical wave.

40. A device for producing code discs comprising the elements of claim 39 wherein the first ribbon is disposed in the direction of motion of the disc from the second ribbon and means are connected between the divider and the ribbon modulator for simultaneously applying separate electrical waves to each ribbon, said waves maintaining fixed the relative position of the first of the ribbons and the disc during separation of the ribbons and maintaining fixed the relative position of the second of the ribbons and the disc during closing of the ribbons.

41. A device for producing code discs comprising the elements of claim 12 wherein the means for producing successive pulses of light comprises a ribbon modulator having first and second parallel adjacent ribbons disposed normal to the direction of motion of the path, the first of said ribbons being disposed in direction of motion of the base member from the second ribbon, and means electrically coupled between the ribbons and the synchronizing means for simultaneously applying separate electrical waves to each ribbon, said waves maintaining fixed the relative position of the first of the ribbons to the base member during separation of the ribbons and maintaining fixed the relative position of the second ribbon to the base member during closing of the ribbons.

42. A device for producing code discs comprising the elements of claim 1 wherein the means for controlling the impingement of light on the turntable comprises a ribbon modulator having first and second parallel adjacent ribbons disposed parallel to a radius of the turntable, the first ribbon being disposed in the direction of motion of the turntable from the second ribbon, and means connected between the flip-flop circuits and the ribbon modulator for simultaneously applying separate electrical waves to each ribbon, said waves maintaining fixed the relative position of the first of the ribbons and the turntable during separation of the ribbons and maintaining fixed the relative position of the second of said ribbons and the turntable during closing of the ribbons.

References Cited in the file of this patent

UNITED STATES PATENTS

| | | |
|---|---|---|
| 2,144,844 | Hickman | Jan. 24, 1939 |
| 2,399,421 | Artzt | Apr. 20, 1946 |
| 2,512,785 | Alburger | June 27, 1950 |
| 2,540,922 | Wickham | Feb. 6, 1951 |
| 2,570,775 | De Baun | Oct. 9, 1951 |
| 2,585,291 | Wittel | Feb. 12, 1952 |
| 2,680,150 | Weld | June 1, 1954 |

UNITED STATES PATENT OFFICE
CERTIFICATE OF CORRECTION

Patent No. 2,924,138                      February 9, 1960

Edward M. Jones

It is hereby certified that error appears in the printed specification of the above numbered patent requiring correction and that the said Letters Patent should read as corrected below.

Column 1, line 57, for "photo-cell" read -- photocell --; column 4, line 30, after "high-frequency" insert -- electrical --; column 12, line 41, for "in" read -- an --; lines 70 and 71, for "ertended" read -- extended --; column 14, line 21, for "greately" read -- greatly --; column 17, line 64, after "will" insert -- be --; column 19, line 44, for "reveices" read -- receives --; column 22, line 74, for "crcular" read -- circular --; column 26, line 35, for "dimensions" read -- dimension --; line 67, for "cyclilc" read -- cyclic --; column 27, line 23, for "oscillationus" read -- oscillations --; line 24, for "oscilllations" read -- oscillations --.

Signed and sealed this 4th day of October 1960.

(SEAL)
Attest:

KARL H. AXLINE                      ROBERT C. WATSON
Attesting Officer                 Commissioner of Patents